(12) United States Patent
Sheriff et al.

(10) Patent No.: US 10,576,862 B1
(45) Date of Patent: Mar. 3, 2020

(54) HEAD RESTRAINT FOR VEHICLE PASSENGER SEAT

(71) Applicant: GM GLOBAL TECHNOLOGY OPERATIONS LLC, Detroit, MI (US)

(72) Inventors: Adil M. Sheriff, Windsor (CA); Henry J. Van Der Laar, Royal Oak, MI (US); Matthew Lewis, Milford, MI (US); Douglas S. Bertoia, Brighton, MI (US); Jaclyn N. Press, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/148,025

(22) Filed: Oct. 1, 2018

(51) Int. Cl.
*B60N 2/888* (2018.01)
*B60N 2/80* (2018.01)

(52) U.S. Cl.
CPC ........ *B60N 2/888* (2018.02); *B60N 2002/899* (2018.02)

(58) Field of Classification Search
CPC ...... B60N 2/888; B60N 2002/899; A47C 7/38
USPC ................................. 297/216.2, 391, DIG. 3
See application file for complete search history.

(56) References Cited

U.S. PATENT DOCUMENTS

| | | | | |
|---|---|---|---|---|
| 3,017,642 A | * | 1/1962 | Rosenberg | A47C 27/084 5/709 |
| 3,027,193 A | * | 3/1962 | Graham | A47C 7/38 297/391 |
| 3,372,407 A | * | 3/1968 | Weber, III | A47C 7/18 5/724 |
| 3,508,788 A | * | 4/1970 | Barton, Jr. | B60N 2/818 297/391 |
| 3,680,912 A | * | 8/1972 | Matsuura | B60N 2/838 297/391 |
| 4,113,310 A | | 9/1978 | Kapanka | |
| 4,865,388 A | | 9/1989 | Nemoto | |
| 5,255,955 A | * | 10/1993 | Matosic | B60N 2/80 297/395 |
| 5,316,372 A | * | 5/1994 | Amner | B29C 44/1233 297/408 |
| 5,660,438 A | * | 8/1997 | Tedesco | A47C 7/467 297/284.1 |
| 5,802,643 A | * | 9/1998 | Sloot | A47C 7/425 297/220 |
| 6,203,105 B1 | | 3/2001 | Rhodes, Jr. | |
| 6,910,714 B2 | | 6/2005 | Browne et al. | |
| 7,140,478 B2 | | 11/2006 | Barvosa-Carter et al. | |
| 7,264,271 B2 | | 9/2007 | Barvosa-Carter et al. | |
| 7,267,367 B2 | | 9/2007 | Barvosa-Carter et al. | |
| 7,309,104 B2 | | 12/2007 | Browne et al. | |
| 7,594,697 B2 | | 9/2009 | Browne et al. | |
| 7,766,423 B2 | | 8/2010 | Alexander et al. | |
| 8,033,600 B2 | | 10/2011 | Reynolds et al. | |
| 8,109,567 B2 | | 2/2012 | Alexander et al. | |
| 8,534,703 B1 | | 9/2013 | Baldwin | |

(Continued)

FOREIGN PATENT DOCUMENTS

EP          0824081 A2 *   2/1998   ............... B60N 2/80

*Primary Examiner* — Milton Nelson, Jr.

(57) ABSTRACT

A head restraint for a vehicle passenger seat for a vehicle. The head restraint includes an outer surface of the head restraint defining a shape of the head restraint, a core support extending into the outer surface, a foam surrounding the core support, and a substantially air impermeable material defining an internal volume and an opening controllably limiting the flow of air into and out of the internal volume.

2 Claims, 3 Drawing Sheets

(56) References Cited

U.S. PATENT DOCUMENTS

| | | |
|---|---|---|
| 8,919,877 B2 | 12/2014 | Eisenbraun |
| 9,283,876 B2 | 3/2016 | Dinger et al. |
| 9,340,131 B1 | 5/2016 | Kolich et al. |
| 2013/0076086 A1 | 3/2013 | Pickett et al. |

* cited by examiner

HEAD RESTRAINT FOR VEHICLE PASSENGER SEAT

FIELD

The present disclosure relates to a head restraint for a vehicle passenger seat.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Vehicular seats include a head restraint to resist rearward movement of an occupant's head in the event of a sudden rear impact of the vehicle. The head restraint includes a core support structure that is rigidly attached to the seat, and a layer of foam disposed over the core support structure to cushion the core support structure. Typically, the head restraint is positioned closely behind the occupant's head in order to limit the rearward movement of the occupant's head in the event of an impact. The head restraint is positioned closely behind the occupant's head to compensate for the compression of the foam during the act of restraining the occupant's head. This position of the head restraint may bring the cushioning foam into contact with the occupant during normal operation of the vehicle, which occupants may find objectionable.

FIGS. 1 and 2 illustrate the challenges associated with designing a head restraint which provides sufficient support in an impact event and which, in particular, limits the amount of neck rotation, while trying to provide a head restraint that is comfortable for the occupant during normal vehicle operation. Both FIGS. 1 and 2 illustrate the response of an occupant head during an impact event. The head restraint 100 in FIG. 1 includes a core support 102 that is surrounded by a foam 104. The foam 104 has a relatively soft and, therefore, more comfortable for the vehicle occupant during normal operation. During an impact event, the relatively high accelerations exerted on the occupant cause the head 106 of the occupant to accelerate at a relatively high rate of speed toward and into the head restraint 100. As a result, the head 106 applies a relatively high force into the foam 104 of the head restraint 100 which due to the low resistance to the rearward motion of the head 106 the foam 104 compresses by a substantial amount. Since the foam 104 compresses readily, the designer of the head restraint 100 must rely almost entirely upon close contact between the head 106 and the core support 102 to limit the amount of neck rotation. Therefore, to limit the amount of neck rotation, the core support 102 must be positioned at a relatively forward angle to position the core support 102 closer to the head 106. This limits the amount of space available for the foam 104 to be positioned between the core support 102 and the occupant head 106, which, in turn, may adversely affect the comfort of the occupant.

FIG. 2 illustrates an alternative embodiment of a head restraint 200 that includes a core support 202 that is also surrounded by a foam 204. The foam 204 of the head restraint 200 in FIG. 2, in contrast to that of FIG. 1, has a higher resistance to rearward motion of an occupant head 206. This higher resistance enables the foam 204 to compress less and, therefore, minimize the rotation of the neck without relying entire upon the close contact between the head 206 and the core support 202. Thus, the core support 202 may be angled further rearward and positioned further away from the head in comparison to that of the head restraint 100 of FIG. 1. However, the higher resistance to rearward motion means that the foam 204 is harder and is generally less comfortable to a vehicle occupant. A head restraint which provides improved comfort to the vehicle occupant while adequately limiting neck rotation is desired.

SUMMARY

In an exemplary aspect, a head restraint includes an outer surface of the head restraint defining a shape of the head restraint, a core support extending into the outer surface, a foam surrounding the core support, and a substantially air impermeable material defining an internal volume and an opening controllably limiting the flow of air into and out of the internal volume.

In this manner, the neck rotation of an occupant during an impact event may be limited without relying solely upon the foam and/or core support which improves the comfort of the head restraint for the occupant.

In another exemplary aspect, the outer surface is defined by the air impermeable material.

In another exemplary aspect, the opening is positioned on a downwardly facing surface of the head restraint.

In another exemplary aspect, the opening is positioned on a side facing surface of the head restraint.

In another exemplary aspect, the opening is positioned on a forward facing surface of the head restraint.

In another exemplary aspect, the opening is positioned on a rear facing surface of the head restraint.

In another exemplary aspect, the opening includes a plurality of openings.

In another exemplary aspect, the substantially air impermeable material defines an internal volume positioned between the core support and a forward portion of the outer surface of the head restraint.

In another exemplary aspect, the air impermeable material defines a plurality of cells, wherein the opening comprises a plurality of openings, and wherein each cell includes at least one of the plurality of openings controllably limiting the flow of air into and out of each cell.

In another exemplary aspect, the substantially air impermeable material includes a vinyl.

In another exemplary aspect, the opening comprises a perforation in the vinyl.

In another exemplary aspect, the substantially air impermeable material includes a leather.

In another exemplary aspect, wherein the opening comprises a perforation in the leather.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 3:
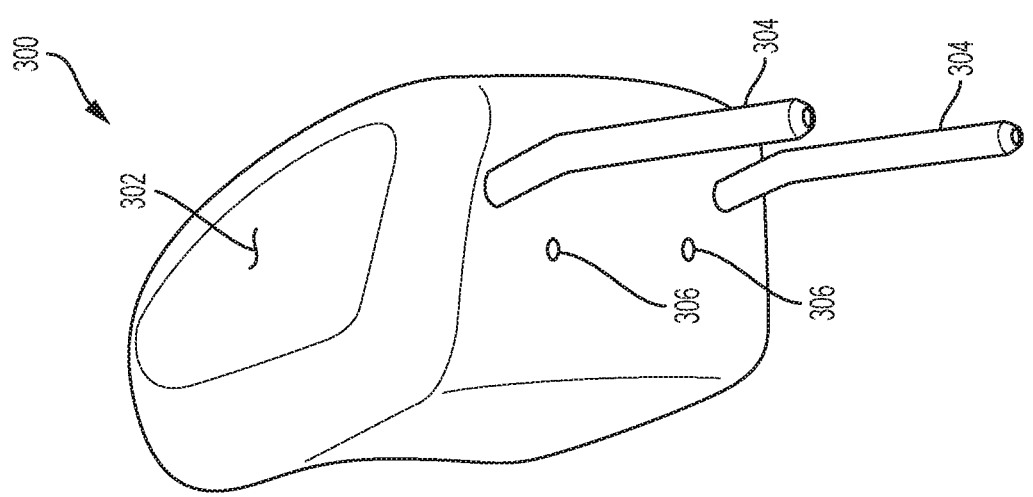
FIG. 3 is a perspective view of an exemplary embodiment of a head restraint in accordance with the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner. Referring now to the drawings, wherein like reference numbers correspond to like or similar components throughout the several figures, FIG. 3 is a perspective view of an exemplary embodiment of a head restraint 300 in accordance with the present disclosure. The head restraint 300 occupies a space that is defined by an outer surface 302. A core support (not shown) is embedded within the outer surface. The core support is attached to core support posts 304 that extend downwardly from the outer surface 302. In this exemplary embodiment, the outer surface 302 is characterized by being formed of a material that is substantially impermeable to a flow of a gas between the space internal to the outer surface 302 and the environment surrounding the head restraint 300. The outer surface material 302 may include vinyl, leather or any other substantially impermeable material without limitation. In this manner, the outer surface 302 of the head restraint 300 defines an internal volume in which a volume of gas may be captured. The outer surface 302 further defines one or more openings 306 which controllably permit the flow of gas from within the outer surface 302 and the environment surrounding the surface 302. The opening(s) 306 are configured such that the amount of mass flowing through them is limited. Air entrained within the head restraint and the controlled mass flow of air through the opening(s) 306 limits the compression of the volume within the outer surface 302. In an impact event, when an occupant's head impacts the outer surface, the controlled mass flow of air through the opening(s) 306 limits the compression of the head restraint thereby further limiting the amount of rotation of the occupant's neck. Therefore, rather than relying solely upon foam in the head restraint and/or the core support limiting the neck rotation, the controlled flow of air escaping from the head restraint also limits the rotation of the neck. In this manner, the softness of foam in the head restraint may be increased and the distance between the core support and the occupant's head may be increased, thereby improving the comfort of the occupant. The head restraint 300 of FIG. 3 includes an outer surface material 302 which defines openings 306 on a downwardly facing surface.

Figure 2:
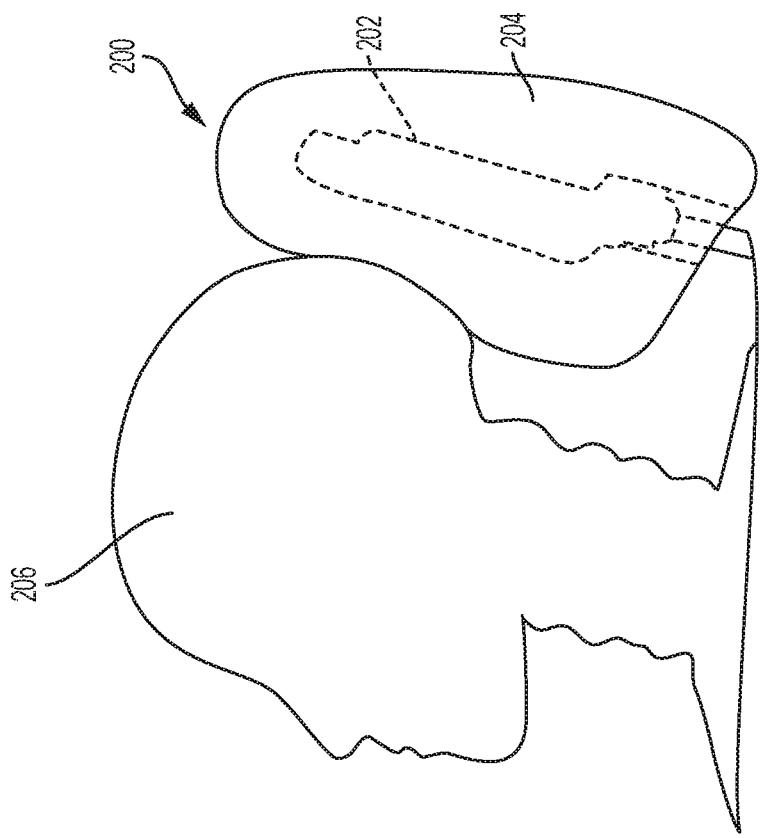
FIG. 2 is a cross-sectional elevation view of another exemplary head restraint having a soft foam during a simulated impact event.
Figure 1:
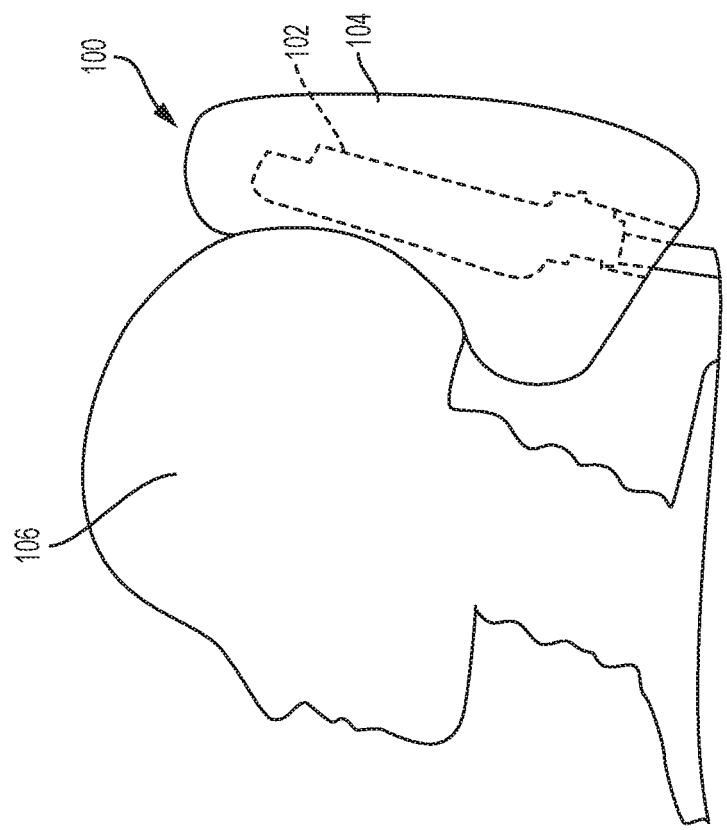
FIG. 1 is a cross-sectional elevation view of an exemplary head restraint having a soft foam during a simulated impact event.
Figure 4:
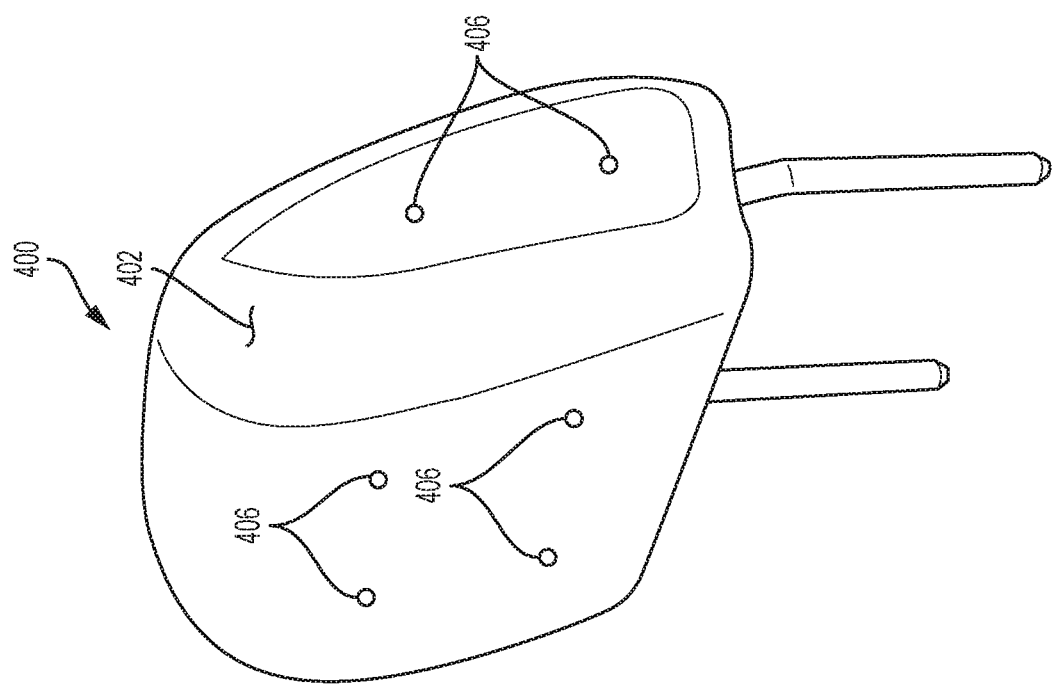
FIG. 4 is a perspective view of another exemplary embodiment of a head restraint in accordance with the present disclosure.

FIG. 4 illustrates a perspective view of another exemplary embodiment of a head restraint 400 in accordance with the present disclosure. The head restraint 400 includes a substantially impermeable outer surface material 402 which defines one or more openings 406 which control the flow of air escaping from the volume enclosed within the outer surface material 402 and into the surrounding environment. The opening(s) 406 are positioned on forward facing and side facing surfaces. It is to be understood that the location of the openings which control the flow of air from the outer surface is not limited.

Figure 5:
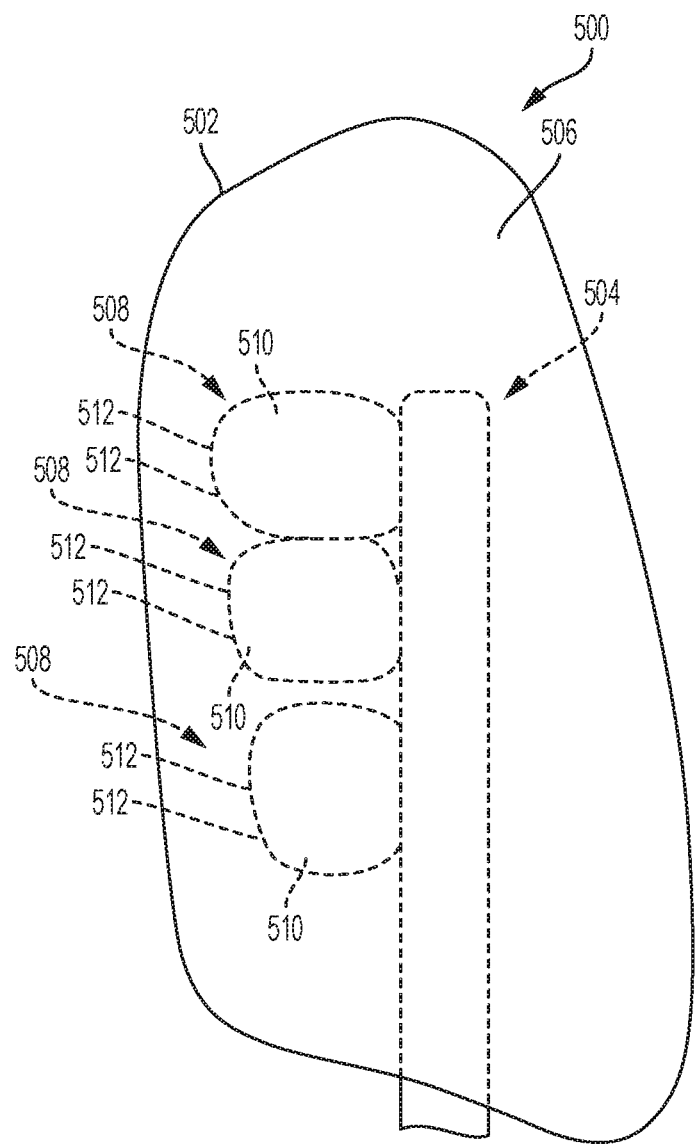
FIG. 5 is a cross-sectional elevation view of yet another exemplary embodiment of a head restraint in accordance with the present disclosure.

FIG. 5 is a cross-sectional elevation view of yet another exemplary embodiment of a head restraint 500 in accordance with the present disclosure. The head restraint 500 is defined by an outer surface material 502 which defines the external shape of the head restraint. In this exemplary embodiment, the outer surface material 502 may be formed of a permeable material which permits the flow of air between the inner volume defined by the outer surface material 502 and the surrounding environment. The head restraint 500 further includes a core support 504 and a foam 506 surrounding the core support 504. In a preferred embodiment, the foam 506 is formed from a soft open cell foam which provides comfort to the head of an occupant. The head restraint 500 further includes one or more cells 508 which are each defined by an impermeable outer surface 510 and one or more openings 512. Each of the cells 508 individually define an internal volume that may be occupied by air. Each of the opening(s) 512 are characterized in that they control the flow of air out of and into the internal volume defined by the outer surface 510 of each cell 508. By controlling the flow of air from each cell 508 during an impact, the amount of rotation of an occupant's head may be limited without relying solely upon the foam 506 and/or the core support 504. This permits the use of a softer foam 506 and/or increasing the distance between the core support 504 and the head of an occupant thereby improving the comfort of an occupant. While FIG. 5 illustrates a head restraint 500 that includes three cells 508 it is to be understood that any number of cells 508 may be used without limitation.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A head restraint for a vehicle passenger seat for a vehicle, the head restraint comprising:
   an outer surface of the head restraint defining a shape of the head restraint;
   a core support extending into the outer surface;
   a foam surrounding the core support; and
   a substantially air impermeable material defining an internal volume and an opening controllably limiting the flow of air into and out of the internal volume, wherein the substantially air impermeable material defines an internal volume positioned between the core support and a forward portion of the outer surface of the head restraint, wherein the air impermeable material defines a plurality of cells, wherein the opening comprises a plurality of openings, and wherein each cell includes at least one of the plurality of openings controllably limiting the flow of air into and out of each cell.

2. A vehicle including a passenger seat, the passenger seat comprising:
- a seat bottom;
- a seat back attached to the seat bottom; and
- a head restraint attached to the seat back, wherein the head restraint comprises:
- an outer surface of the head restraint defining a shape of the head restraint;
- a core support extending into the outer surface;
- a foam surrounding the core support; and
- a substantially air impermeable material defining an internal volume and an opening controllably limiting the flow of air into and out of the internal volume, wherein the substantially air impermeable material defines an internal volume positioned between the core support and a forward portion of the outer surface of the head restraint, wherein the air impermeable material defines a plurality of cells, wherein the opening comprises a plurality of openings, and wherein each cell includes at least one of the plurality of openings controllably limiting the flow of air into and out of each cell.

* * * * *